US009397810B2

(12) United States Patent
Kim et al.

(10) Patent No.: US 9,397,810 B2
(45) Date of Patent: Jul. 19, 2016

(54) METHOD FOR TRANSMITTING AND RECEIVING PILOT SIGNAL IN COMMUNICATION SYSTEM

(71) Applicant: Electronics & Telecommunications Research Institute, Daejeon (KR)

(72) Inventors: Ji Hyung Kim, Daejeon (KR); Jun Hwan Lee, Seoul (KR); Tae Soo Kwon, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/334,084

(22) Filed: Jul. 17, 2014

(65) Prior Publication Data

US 2015/0023241 A1    Jan. 22, 2015

(30) Foreign Application Priority Data

Jul. 18, 2013 (KR) .......................... 10-2013-0084739
Jul. 17, 2014 (KR) .......................... 10-2014-0090125

(51) Int. Cl.
*H04L 5/00* (2006.01)
*H04W 84/04* (2009.01)

(52) U.S. Cl.
CPC ............. *H04L 5/005* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,509,213 B2 | 8/2013 | Sivanesan et al. | |
| 2011/0183680 A1* | 7/2011 | Yi | H04W 72/1231 455/450 |
| 2011/0189986 A1 | 8/2011 | Tinnakornsrisuphap et al. | |
| 2012/0040705 A1* | 2/2012 | Shindo | H04W 72/005 455/509 |
| 2014/0198655 A1* | 7/2014 | Ishii | H04W 76/023 370/235 |

FOREIGN PATENT DOCUMENTS

KR    10-2009-0053437 A    5/2009

* cited by examiner

*Primary Examiner* — Hoon J Chung
(74) *Attorney, Agent, or Firm* — NSIP Law

(57) ABSTRACT

Disclosed are methods for transmitting and receiving pilot signals in a communication system. A method for transmitting and receiving pilot signal, performed in a first personal base station among a plurality of personal base stations existing within a cell range of a master base station, comprises receiving a cyclic shift set from the master base station; generating pilot signal based on a first cyclic shift value assigned to the first personal base station, wherein the first cyclic shift value is included in the cyclic shift set; and transmitting the generated pilot signal. Thus, performance of channel estimation may be enhanced.

15 Claims, 6 Drawing Sheets

METHOD FOR TRANSMITTING AND RECEIVING PILOT SIGNAL IN COMMUNICATION SYSTEM

CLAIM FOR PRIORITY

This application claims priorities to Korean Patent Application No. 10-2013-0084739 filed on Jul. 18, 2013, and No. 10-2014-0090125 filed on Jul. 17, 2014 in the Korean Intellectual Property Office (KIPO), the entire contents of which are hereby incorporated by references.

BACKGROUND

1. Technical Field

Example embodiments of the present invention relate to a method for transmitting and receiving pilot signal, and more specifically to methods for transmitting and receiving pilot signals for detecting data or interferences in an environment where a plurality of nodes exist.

2. Related Art

In a cellular communication environment, a general method for exchanging data between terminals is a communication method via a base station. That is, if a first terminal has data to be transmitted to a second terminal, the first terminal transmits the data to a first base station to which it belongs. Then, the first base station transmits the data received from the first terminal to a second base station to which the second terminal belongs through a core network. At last, the second base station transmits the data received from the first base station to the second terminal. Here, the first base station and the second base station may be same, or may be different.

Meanwhile, when a device-to-device communication, a communication between small cell base stations, or a communication between personal base stations is performed, communication entities may communicate with each other by using the same time-frequency resources (that is, co-channel.) In this case, channel estimation should be performed for data detection or interference cancellation. However, when the same pilot signals are used or correlation between pilot signals is high, performance of channel estimation may degrade.

SUMMARY

Accordingly, example embodiments of the present invention are provided to substantially obviate one or more problems due to limitations and disadvantages of the related art.

Example embodiments of the present invention provide a method for transmitting and receiving pilot signal for enhancing channel estimation performance, in an environment in which communications are performed based on common channel.

Example embodiments of the present invention also provide an apparatus for transmitting and receiving pilot signal for enhancing channel estimation performance, in an environment in which communications are performed based on common channel.

In some example embodiments, a method for transmitting and receiving pilot signal, performed in a first personal base station among a plurality of personal base stations existing within a cell range of a master base station, the method comprises receiving a cyclic shift set from the master base station; generating a pilot signal based on a first cyclic shift value assigned to the first personal base station, wherein the first cyclic shift value is included in the cyclic shift set; and transmitting the generated pilot signal.

Here, the cyclic shift set includes cyclic shift values assigned to the plurality of personal base stations.

Here, the cyclic shift values are configured differently for each of the plurality of personal base stations.

Here, the cyclic shift set is transmitted to the plurality of personal base stations in broadcast manner.

Here, the method further comprises when data is received from a second personal base station among the plurality of personal base stations, performing channel estimation based on a second cyclic shift value assigned to the second personal base station, wherein the second cyclic shift value is included in the cyclic shift set.

In some example embodiments, a method for transmitting and receiving pilot signal, performed in a representative personal base station included in a first personal base station group among at least one personal base station group each of which comprises a plurality of personal base stations existing within a cell range of a master base station, the method comprises receiving a first cyclic shift set for the first personal base station group from the master base station; and assigning cyclic shift values included in the first cyclic shift set to the plurality of personal base stations included in the first personal base station group.

Here, the first cyclic shift set is configured differently from a cyclic shift set for another personal base station group.

Here, the cyclic shift values are configured differently for each of the plurality of personal base stations included in the first personal base station group.

Here, the first cyclic shift set is transmitted to the first personal base station group in groupcast manner.

Here, the method further comprises generating a pilot signal based on a cyclic shift value assigned to the representative personal base station among the first cyclic shift set; and transmitting the generated pilot signal.

Here, the method further comprises when data is received from a first personal base station belonging to the first personal base station group, performing channel estimation for receiving the data based on a cyclic shift value which is included in the first cyclic shift set and assigned to the first personal base station.

Here, the method further comprises when data is received from a personal base station belonging to a second personal base station group which is different from the first personal base station group, performing channel estimation for receiving the data in blind searching manner.

Here, the method further comprises transmitting information on the cyclic shift values assigned to the plurality of personal base stations of the first personal base station group to the master base station.

Here, the method further comprises receiving, from the master base station, information on at least one cyclic shift value assigned to at least one personal base station of at least one personal base station group located within the cell range of the master base station; and when data is received from a personal base station belonging to a second personal base station group which is different from the first personal base station group and located within the cell range of the master base station, performing channel estimation based on a cyclic shift value assigned to the personal base station belonging to the second personal base station group.

In some example embodiments, a method for transmitting pilot signal, performing in a first personal base station among a plurality of personal base stations existing within a cell range of a master base station, the method comprises receiving a cyclic shift set from the master base station, when a portion of a first time-frequency resource used by the first personal base station is identical to a second time-frequency resource used by a second personal base station among the plurality of personal base stations, generating a first pilot signal by applying a first cyclic shift value of the first personal base station which is included the cyclic shift set to a region of the first time-frequency resource which overlaps with the second time-frequency resource, and generating a second pilot signal by applying the first cyclic shift value to a region of the first time-frequency resource which does not overlap with the second time-frequency resource; and transmitting the first pilot signal and the second pilot signal.

Here, the cyclic shift set includes cyclic shift values assigned to the plurality of personal base stations.

Here, each of the cyclic shift values is configured differently for each of the plurality of personal base stations.

Here, the first cyclic shift set is transmitted to the plurality of personal base stations in broadcast manner.

According to the present invention, channel estimation performance can be enhanced in an environment of communications based on co-channel.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
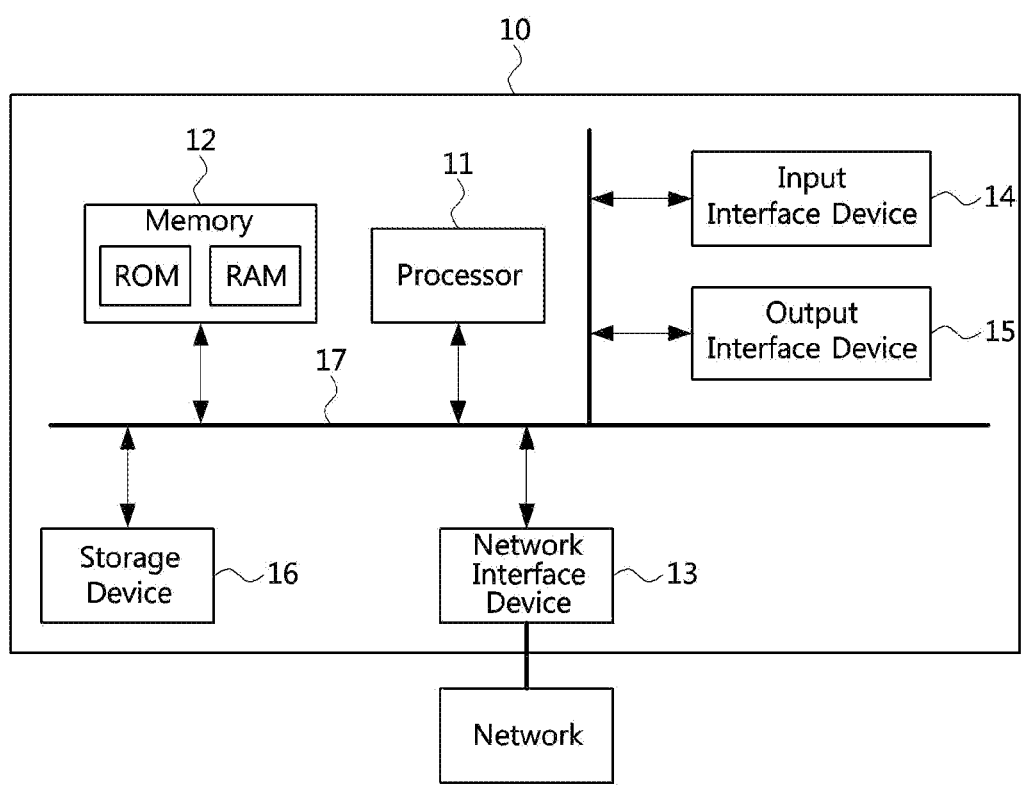
FIG. 1 is a block diagram illustrating an example embodiment of a station performing methods according to the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. To aid in understanding the present invention, like numbers refer to like elements throughout the description of the drawings, and the description of the same element will not be reiterated.

In the entire specification, a network may include a wireless internet such a wireless fidelity (WIFI), a portable internet such as a wireless broadband internet (WiBro) or a world interoperability for microwave access (WiMax), a 2G mobile communication network such as a global system for mobile communication (GSM) or a code division multiple access (CDMA), a 3G mobile communication network such as a wideband code division multiple access (WCDMA) or CDMA2000, a 3.5G mobile communication network such as a high speed downlink packet access (HSDPA) or a high speed uplink packet access (HSUPA), a 4G mobile communication network such as a long term evolution (LTE) or a LTE-Advanced, and a 5G mobile communication network.

Also, in the entire specification, the 'terminal may' refer to user equipment (UE), a mobile station (MS), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms.

Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and reproduction appliances having a wireless communication function, Internet appliances enabling wireless Internet connection and browsing, and a portable unit or terminals with integrated combinations of such functions, but are not limited thereto.

Also, the "base station" used in this specification means a fixed point that communicates with terminals, and may be referred to as another word, such as an access point, a radio access station, Node-B, eNode-B, a base transceiver system (BTS), a mobile multihop relay-base station (MMR-BS), etc.

The "base station" may include entire or some features of the access point, the radio access station, Node-B, eNode-B, the BTS, the MMR-BS, etc.

FIG. 1 is a block diagram illustrating an example embodiment of a station performing methods according to the present invention.

Referring to FIG. 1, a station 10 may comprise at least one processor 11, a memory 12, and a network interface device 13 performing communications with a network 20. In addition, the station 10 may further comprise an input interface device 14, an output interface device 15, and a storage device 16, etc. Each components constituting the station 10 may be connected through a bus 17, and communicate with each other.

The processor 11 may execute program codes stored in the memory 12 and/or the storage device 16. The processor 11 may be a central processing unit (CPU), a graphics processing unit (GPU), or a dedicated processor on which the methods according to the present invention are performed. The memory 12 and the storage device 16 may be configured with at least one volatile memory device and/or at least one non-volatile memory device. For example, the memory 12 may be configured with a read-only memory (ROM) and/or a random access memory (RAM).

Hereinafter, each of communication entities such as personal base stations and base stations, as a station, may have the above-described configuration.

In the LTE communication system, different basic sequence ($\bar{r}_{u,v}$) may be defined for a pilot signal for each macro cell operated by a base station (eNB). Also, a modified sequence ($r_{u,v}^{\alpha_i}$, i=0, 1, ..., $N_C$) which is cyclic-shifted by $\alpha_i$ from the basic sequence may be used within a macro cell.

Generally, since basic sequences having low correlation or basic sequences orthogonal to each other are respectively used for macro cells, a communication entity (i.e. a base station or a terminal) may distinguish each macro cell when it performs channel estimation. Also, basic sequences having low correlation or basic sequences orthogonal to each other may be used in order to distinguish a plurality of layers (or, antenna ports). For example, two cyclic shifts $\alpha_1$ and $\alpha_2$ can be used for two layers. Thus, a communication entity may distinguish each layer by using a cyclic shift value assigned to it when it performs channel estimation.

On the other hand, when a device-to-device communication, a communication between small cell base stations, or a communication between personal base stations is performed, communication entities can perform communications by using the same time-frequency resources (that is, co-channel). Although co-channel may be assigned to communication entities for increase of system capacity or interference cancellation, channel estimation should be performed for data detection or interference cancellation in the co-channel environment.

Figure 2:
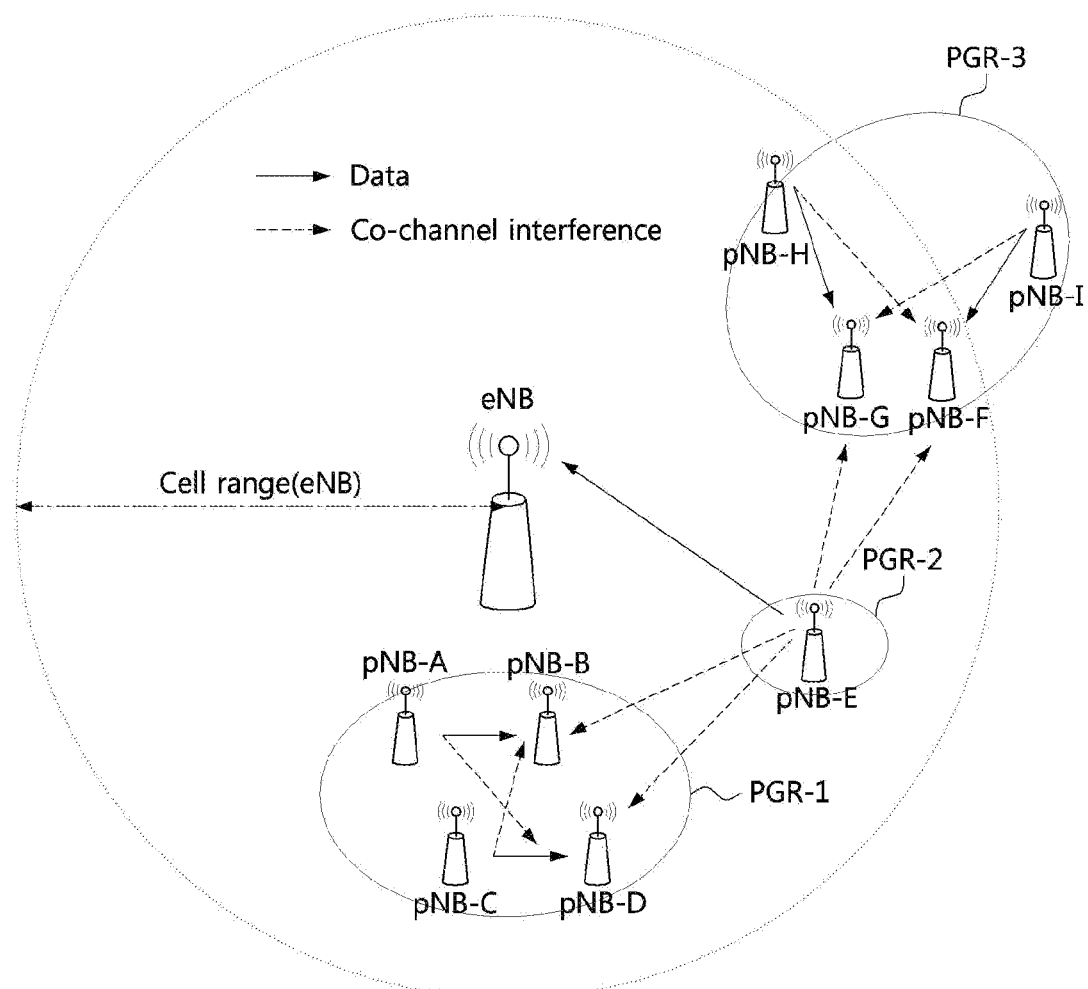
FIG. 2 is a conceptual diagram illustrating a co-channel network environment.

FIG. 2 is a conceptual diagram illustrating a co-channel network environment.

Referring to FIG. 2, an eNB may mean a macro base station managing a macro cell, and each of pNB-A to pNB-I may mean a personal base station (hereinafter, referred to as 'PBS') which manages its personal cell. It is assumed that the base stations pNB-A to pNB-F are located within a cell range of the eNB and the base station pNB-I is located out of the cell range of the eNB. Also, the base stations pNB-A, pNB-B, pNB-C, and pNB-D form a PGR (PGR), and it may be referred to as a 'PGR-1.' That is, any PBS belonging to the PGR-1 may be located within a cell range of other PBS belong to the PGR-1. Also, the base station pNB-E may form another PGR (PGR-2). Also, the base stations pNB-F, pNB-G, pNB-H, and pNB-I may form other personal base station group (PGR-3). That is, any PBS belonging to the PGR-3 may be located within a cell range of other PBS belong to the PGR-3. Here, the PBS may be a small cell base station, a femtocell base station, etc.

When fully or partially identical time-frequency resources are assigned to all PBSs belonging to the PGR-1, a signal transmission from pNB-A to pNB-B may give interferences to pNB-D, and a signal transmission from pNB-C to pNB-D may give interferences to pNB-B. Also, when fully or partially identical time-frequency resources are assigned to all PBSs belonging to the PGR-3, a signal transmission from pNB-H to pNB-G may give interferences to pNB-F, and a signal transmission from pNB-I to pNB-F may give interferences to pNB-G. Also, when fully or partially identical time-frequency resources are assigned to PBSs pNB-A to pNB-I, a signal transmission from pNB-E to eNB may give interferences to pNB-B, pNB-D, pNB-G, and pNB-F. In these environments, channel estimation should be performed for data detection or interference cancellation (or, suppression).

Figure 3:
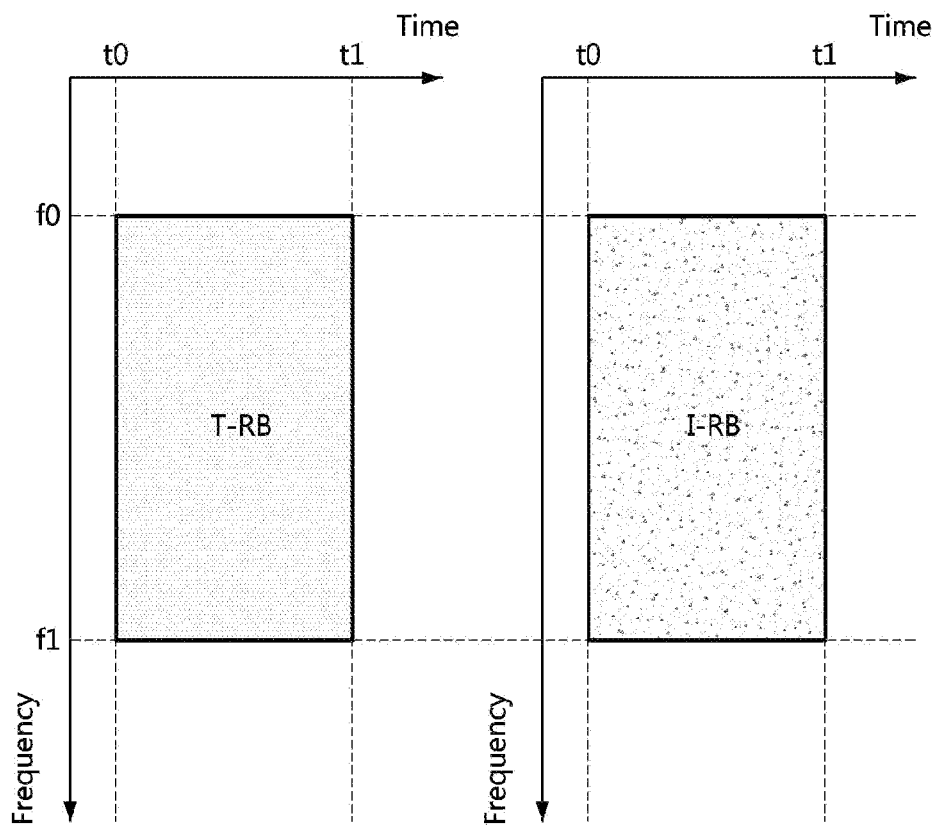
FIG. 3 is a conceptual diagram illustrating an example of resource allocation in case of full co-channel configuration.

FIG. 3 is a conceptual diagram illustrating an example of resource allocation in case of full co-channel configuration.

Referring to FIG. 3, the left side of FIG. 3 illustrates a transmission-resource block (T-RB) whose resources can be used by a communication entity for its data transmission or reception. Meanwhile, the right side of FIG. 3 illustrates an interference-resource block (I-RB) whose resources can give interferences to the data transmission or reception of the communication entity. The full co-channel environment may mean an environment in which time-frequency resources of the T-RB are completely identical to time-frequency resources of the I-RB. Thus, when a PBS transmits or receives data through the T-RB, data transmission or reception which is performed by any other communication entity through the I-RB (identical to the T-RB) may give severe interferences to the PBS.

Figure 4:
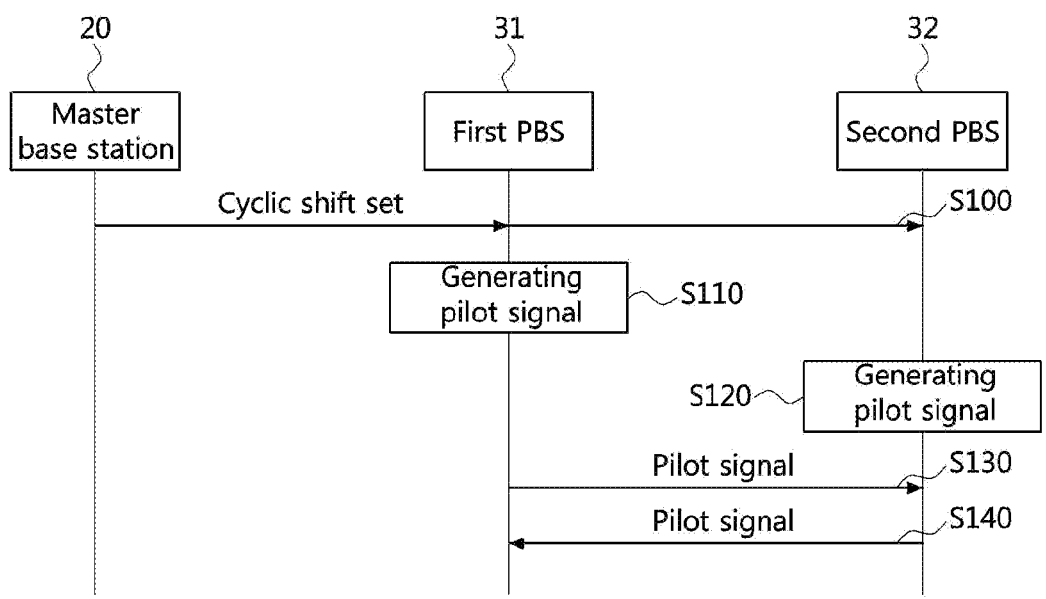
FIG. 4 is a flow chart illustrating a method for transmitting and receiving pilot signals according to an example embodiment of the present invention.

FIG. 4 is a flow chart illustrating a method for transmitting and receiving pilot signals according to an example embodiment of the present invention.

Referring to FIG. 4, a master base station 20 may mean a macro base station managing a macro cell. A first PBS 31 and a second PBS 32 may mean base stations managing respective personal cells. The first PBS 31 and the second PBS 32 may be located within a cell range of the master base station 20. Also, it is assumed that communications between the master base station 20, the first PBS 31, and the second PBS 32 may be performed through full co-channel.

The master base station 20 can configure a first cyclic shift value for the first PBS 31 and a second cyclic shift value for the second PBS 32. Here, the first cyclic shift value may be configured as a different value from the second cyclic shift value. That is, the master base station 20 may respectively configure different cyclic shift values for a plurality of PBSs located within it cell range.

The master base station 20 may generate a cyclic shift set including the first cyclic shift value and the second cyclic shift value. Alternatively, the master base station 20 may generate a cyclic shift set including an index corresponding to the first cyclic shift value and an index corresponding to the second cyclic shift value. The master base station 20 may transmit the cyclic shift set (S100). Here, the master base station 20 may broadcast the cyclic shift set to all PBSs within its cell range, including the first PBS 31 and the second PBS 32.

Then, the first PBS 31 and the second PBS 32 may transmit and receive pilot signals based on cyclic shift values respectively assigned to each of them. For example, when the first PBS 31 receives the cyclic shift set, it may generate a first pilot signal based on the first cyclic shift value (or, the index corresponding to the first cyclic shift value) included in the cyclic shift set (S110). Also, when the second PBS 32 receives the cyclic shift set, it may generate a second pilot signal based on the second cyclic shift value (or, the index corresponding to the second cyclic shift value) included in the cyclic shift set (S120).

The first PBS 31 may transmit signals including data and the first pilot signal to the second PBS 32 (S130). If the second PBS 32 wants to receive data from the first PBS 31, it can estimate channel between it and the first PBS 31 based on the first cyclic shift value (i.e. the cyclic shift value of the first PBS 31) included in the cyclic shift set. The second PBS 32 may transmit signals including data and the second pilot signal to the first PBS 31 (S140). If the first PBS 31 wants to receive data from the second PBS 32, it can estimate channel between it and the second PBS 32 based on the second cyclic shift value (i.e. the cyclic shift value of the second PBS 32) included in the cyclic shift set.

Figure 5:
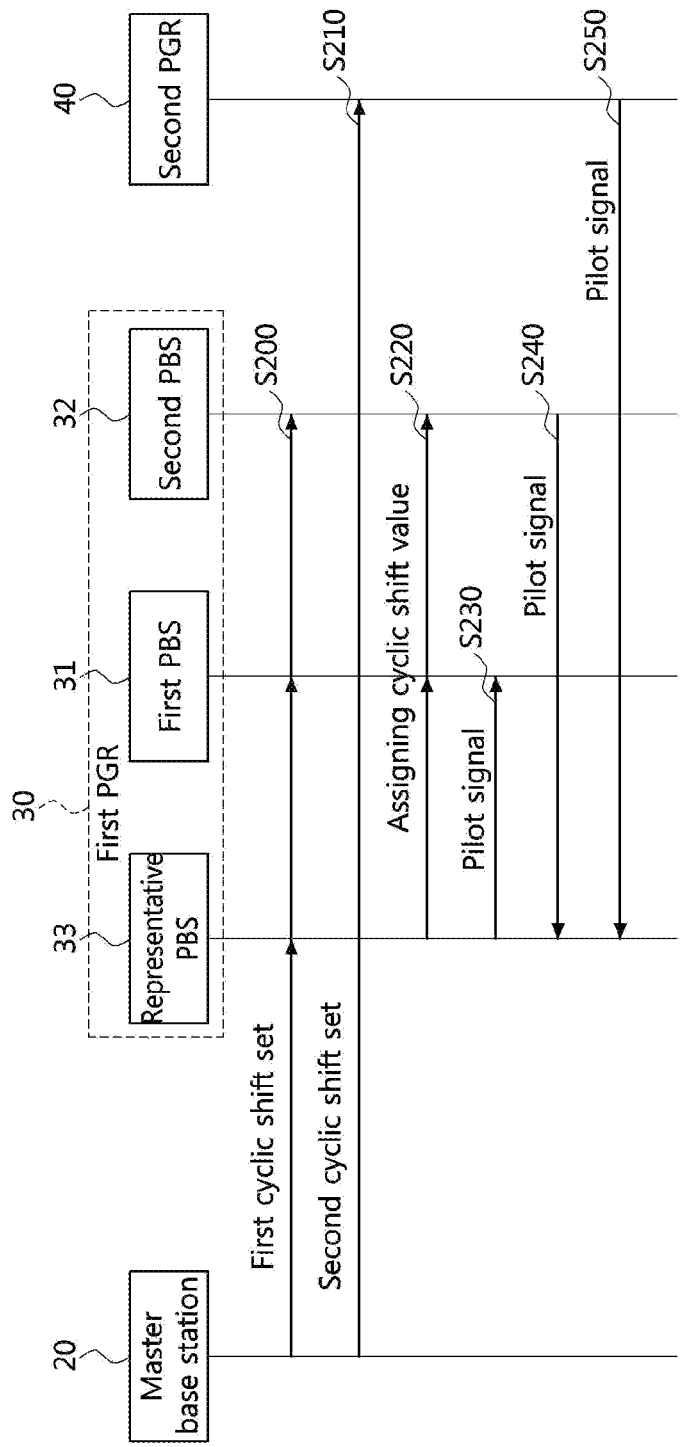
FIG. 5 is a flow chart illustrating a method for transmitting and receiving pilot signals according to another example embodiment of the present invention.

FIG. 5 is a flow chart illustrating a method for transmitting and receiving pilot signals according to another example embodiment of the present invention.

Referring to FIG. 5, a master base station 20 may mean a macro base station managing a macro cell. A first PBS 31 and a second PBS 32 may mean base stations managing respective personal cells. The first PBS 31 and the second PBS 32 may be located within a cell range of the master base station 20. A PBS belonging to the first PGR 30 may be located within a cell range of other PBS belonging to the first PGR. The second PGR 40 may include at least one PBS, and be located within a cell range of the master base station 20. A PBS belonging to the second PGR 40 may be located within a cell range of other PBS belonging to the second PGR 40. Communications between the master base station 20, the first PBS 31, and the second PBS 32 may be performed through full co-channel.

The master base station 20 may generate a first cyclic shift set for the first PGR 30. The master base station 20 may generate a first cyclic shift set including as many (or, more) cyclic shift values (e.g. a1, a2, and a3) or indexes corresponding to cyclic shift values as (or, than) the number of PBSs belonging to the first PGR 30. The master base station 20 may transmit the first cyclic shift set to the first PGR (S200). Here, the master base station 20 may transmit the first cyclic shift set to PBSs belonging to the first PGR 30 in groupcast manner. Alternatively, the master base station 20 may transmit the first cyclic shift set to a representative PBS 33 of the first PGR in unicast manner.

Also, the master base station 20 may generate a second cyclic shift set for the second PGR 40. The master base station 20 may configure a second cyclic shift set including as many (or, more) cyclic shift values or indexes corresponding to cyclic shift values as (or, than) the number of PBSs belonging to the second PGR. Here, the second cyclic shift set may have different values from those of the first cyclic shift set. That is, the master base station 20 may configure different cyclic shift sets for respective PGRs located within its cell range. The master base station 20 may transmit the second cyclic shift set to the second PGR 40 (S210). Here, the master base station 20 may transmit the second cyclic shift set to PBSs belonging to the second PGR in groupcast manner. Alternatively, the master base station 20 may transmit the second cyclic shift set to a representative PBS of the second PGR 40 in unicast manner.

The representative PBS 33 of the first PGR 30 which receives the first cyclic shift set may assign the cyclic shift values in the first cyclic shift set to PBSs belonging to the first PGR 30, respectively (S220). The representative PBS 33 may assign a cyclic shift value to the first PBS 31, assign another cyclic shift value to the second PBS 32, and assign other cyclic shift values included in the first cyclic shift set to itself. That is, different cyclic shift values may be assigned to PBSs belonging to the first PGR 30. Here, the representative PBS 33 may transmit information on assigned cyclic shift values to the PBSs included in the first PGR in broadcast or groupcast manner. The information on assigned cyclic shift values may include information cyclic shift values assigned to all PBSs belonging to the first PGR 30. In the similar manner, cyclic shift values of the second cyclic shift set may be assigned to PBSs belong to the second PGR 40.

Then, each of PBSs belonging to the first PGR 30 and the second PGR 40 may transmit signals based on the cyclic shift value assigned to each. For example, the representative PBS 33 may generate a pilot signal based on the cyclic shift value assigned to it, and transmit signals including data and the generated pilot signal to the first PBS 31 (S230). Since the first PBS 31 already knows which cyclic shift value is assigned to the representative PBS 33, when it wants to receive data from the representative PBS 33, it can perform channel estimation based on the cyclic shift value assigned to the representative PBS 33.

Similarly, the second PBS 32 may generate a pilot signal based on the cyclic shift value assigned to it, and transmit signals including data and the generated pilot signal to the representative PBS 33 (S240). Since the representative PBS 33 already knows which cyclic shift value is assigned to the second PBS 32, when it wants to receive data from the second PBS 32, it can perform channel estimation based on the cyclic shift value assigned to the second PBS 32.

A PBS belonging to the second PGR 40 may generate a pilot signal based on the cyclic shift value assigned to it, and transmit signals including data and the generated pilot signal to the representative PBS 33 of the first PGR 30 (S250). In this case, since the representative PBS 33 does not know the cyclic shift value assigned to the PBS belonging to the second PGR 40 (that is, a PBS belonging to the first PGR 30 does not know cyclic shift values assigned to PBSs of other PGRs except the first PGR), it can estimate the cyclic shift value assigned to the PBS belonging to the second PGR 40 based on a blind searching method. For example, the representative PBS 33 may perform a discrete Fourier transform (DFT) interpolation on signal received from the PBS belonging to the second PGR 40, and perform an inverse discrete Fourier transform (IDFT) on the processed signal. Then, the representative PBS 33 may consider a pilot signal as being transmitted through an arbitrary region, when sum of received signal strength of the arbitrary region is greater than a preconfigured threshold value, and estimate channel based on the considered pilot signal.

Figure 6:
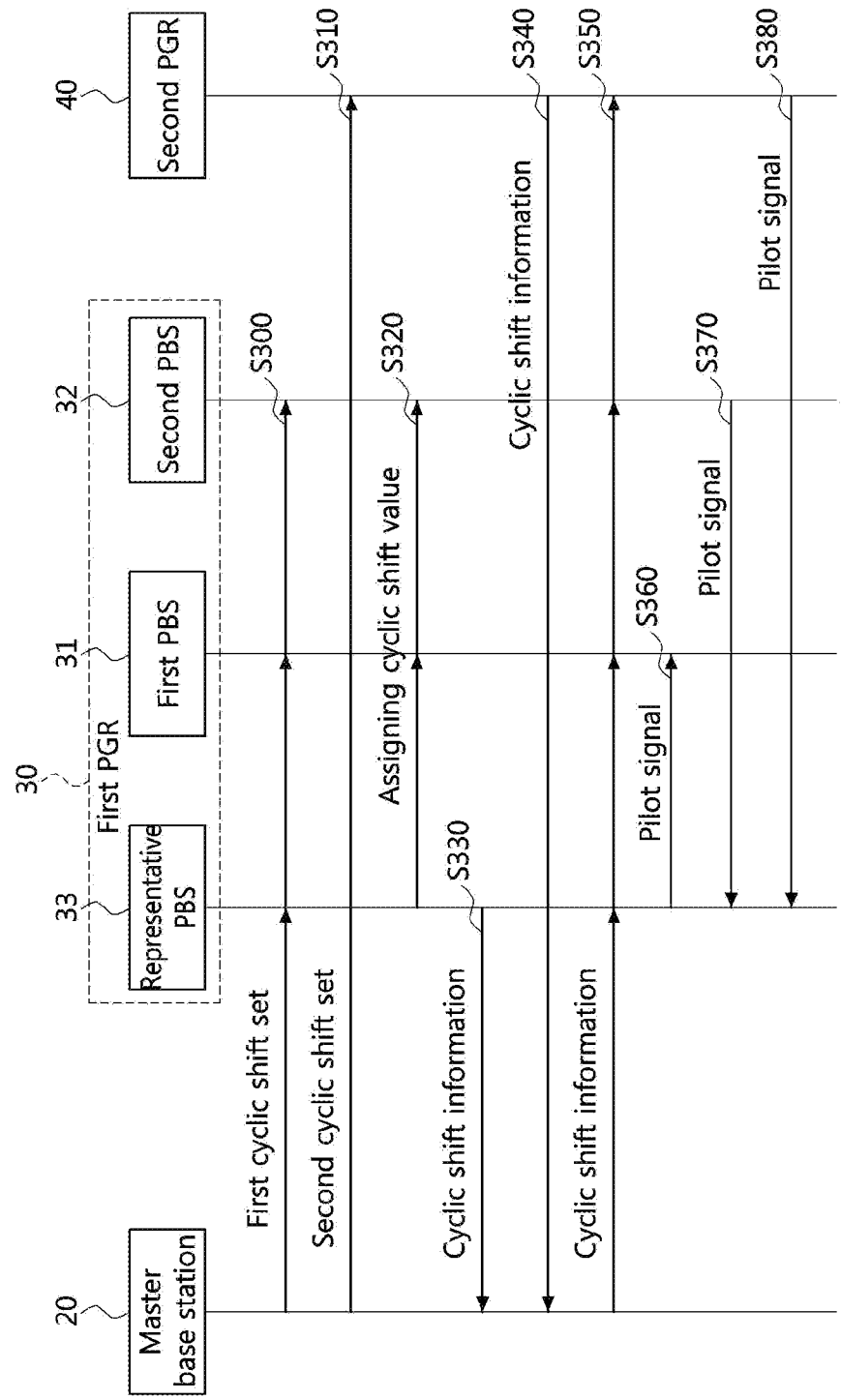
FIG. 6 is a flow chart illustrating a method for transmitting and receiving pilot signals according to another example embodiment of the present invention.

FIG. 6 is a flow chart illustrating a method for transmitting and receiving pilot signals according to another example embodiment of the present invention.

Referring to FIG. 6, the master base station 20 may mean a macro base station managing a macro cell. The first PGR 30 may include a plurality of PBSs (i.e. the representative PBS 33, the first PBS 31, and the second PBS 32), and may be located within a cell range of the master base station 20. A PBS of the first PGR 30 may also be located within a cell range of another PBS of the first PGR 30. Also, the second PGR 40 may include at least one PBS, and be located within the cell range of the master base station 20. Also, a PBS of the second PGR 40 may also be located within a cell range of another PBS of the second PGR 40. Communications between the master base station 20, the PBSs belonging to the first PGR 30, and the PBSs belonging to the second PGR 40 may be performed through full co-channel.

The master base station 20 may generate a first cyclic shift set for the first PGR 30, and transmit the generated first cyclic shift set to the first PGR 30 (S300). Here, the detailed method for generating and transmitting the first cyclic shift set may be identical to the step S200 explained by referring to FIG. 5. Also, the master base station 20 may generate a second cyclic shift set for the second PGR 40, and transmit the generated second cyclic shift set to the second PGR 40 (S310). Here, the detailed method for generating and transmitting the second cyclic shift set may be identical to the step S210 explained by referring to FIG. 5.

The representative PBS 33 of the first PGR 30 which receives the first cyclic shift set may assign the cyclic shift values in the first cyclic shift set to PBSs belonging to the first PGR 30, respectively (S320). Here, the detailed method for assigning cyclic shift values to PBSs belonging to the first PGR 30 may be identical to the step S220 explained by referring to FIG. 5. The representative PBS 33 of the first PGR 30 may transmit information on cyclic shift values assigned to PBSs of the first PGR 30 to the master base station 20 (S330). That is, the representative PBS 33 may transmit information on a cyclic shift value assigned to the first PBS 31 and a cyclic shift value assigned to the second PBS 32 to the master base station 20.

Similarly, cyclic shift values of the second cyclic shift set may be assigned to PBSs of the second PGR 40. Also, the representative PBS of the second PGR 40 may transmit information on cyclic shift values assigned to PBSs of the second PGR 40 to the master base station 20 (S340).

When the mater base station 20 receives the information on cyclic shift values assigned to all PBSs of its all PGRs (e.g. the first personal PGR 30 and the second PGR 40), it may generate cyclic shift information including information on assigned cyclic shift values, and transmit the generated cyclic shift information in broadcast manner (S350). Then, any PBS which receives the cyclic shift information from the master base station 20 can know cyclic shift values assigned to PBSs belonging to other PGRs.

After then, PBSs belonging to the first PGR 30 and the second PGR 40 may transmit and receive data based on the assigned cyclic shift values. For example, the representative PBS 33 may generate a pilot signal based on the cyclic shift value assigned to it, and transmit signals including data and the generated pilot signal to the first PBS 31 (S360). Since the first PBS 31 already knows which cyclic shift value is assigned to the representative PBS 33, when it wants to receive data from the representative PBS 33, it can perform channel estimation based on the cyclic shift value assigned to the representative PBS 33.

Similarly, the second PBS 32 may generate a pilot signal based on the cyclic shift value assigned to it, and transmit signals including data and the generated pilot signal to the representative PBS 33 (S370). Since the representative PBS 33 already knows which cyclic shift value is assigned to the second PBS 32, when it wants to receive data from the second PBS 32, it can perform channel estimation based on the cyclic shift value assigned to the second PBS 32.

Figure 7:
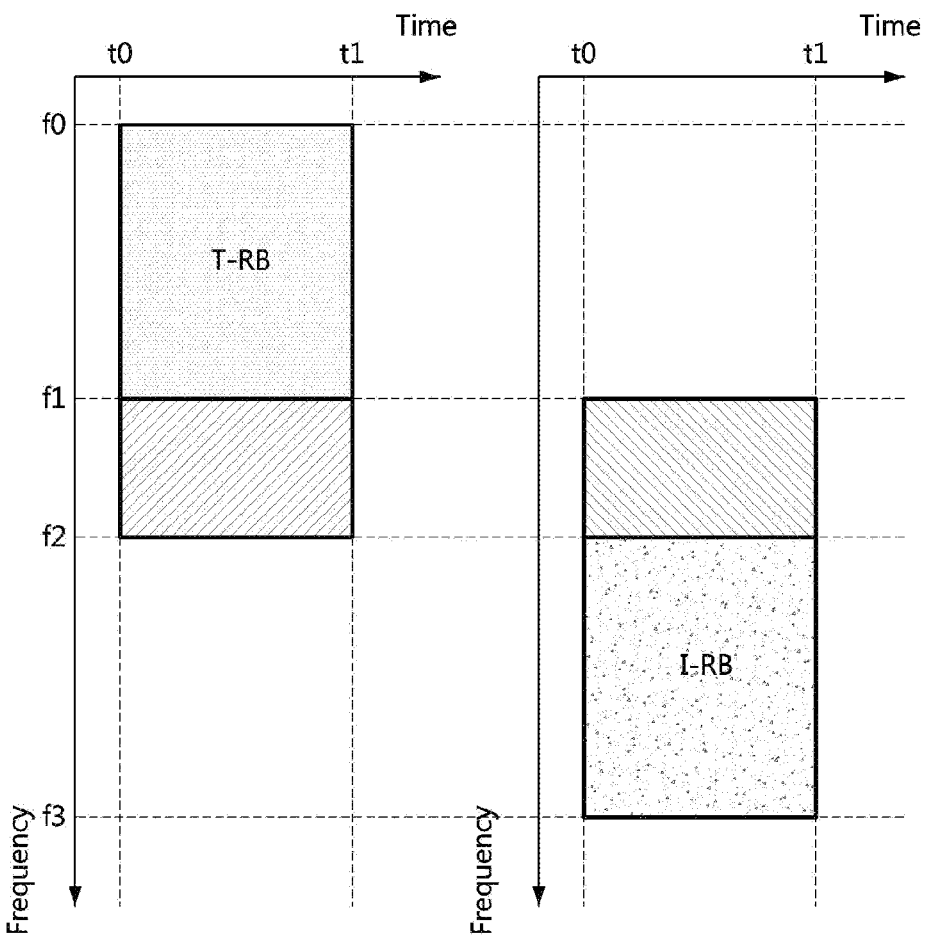
FIG. 7 is a conceptual diagram illustrating an example of resource allocation in case of partial co-channel configuration.

Meanwhile, a PBS belonging to the second PGR 40 may generate a pilot signal based on the cyclic shift value assigned to it, and transmit signals including data and the generated pilot signal to the representative PBS 33 of the first PGR 30 (S380). In this case, the representative PBS 33 may identify a cyclic shift value assigned to a PBS of other PGR based on the cyclic shift information received from the master base station 20. Thus, since the representative PBS 33 already knows the cyclic shift value assigned to the PBS of the second PGR 40, when it wants to receive data from the PBS of the second PGR 40, it can perform channel estimation based on the cyclic shift value assigned to the PBS of the second PGR 40. FIG. 7 is a conceptual diagram illustrating an example of resource allocation in case of partial co-channel configuration.

Referring to FIG. 7, a portion of time-frequency resources of a transmission-resource block (T-RB) may be overlapped with at least a portion of an interference transmission-resource block (I-RB). That is, the T-RB and the I-RB may overlap in frequency regions f1~f2 of temporal regions t0~t1 (i.e. an overlapping region). Basically, a pilot signal may be configured according to the size of resource blocks in the LTE communication system. For example, since subcarriers of the T-RB are f0~f2, the size of the pilot signal may be set to be the size corresponding to f0~f2. Identically, since subcarriers of the I-RB are f1~f3, the size of the pilot signal may be set to be the size corresponding to f1~f3. When portions of resources used by the communication entities overlap, pilot signals in the overlapping region may have high correlations, whereby it may become difficult for the communication entities to separate channels. Therefore, in order to resolve the above-described problem, pilot signals may be configured respectively for the overlapping region and the non-overlapping region.

Figure 8:
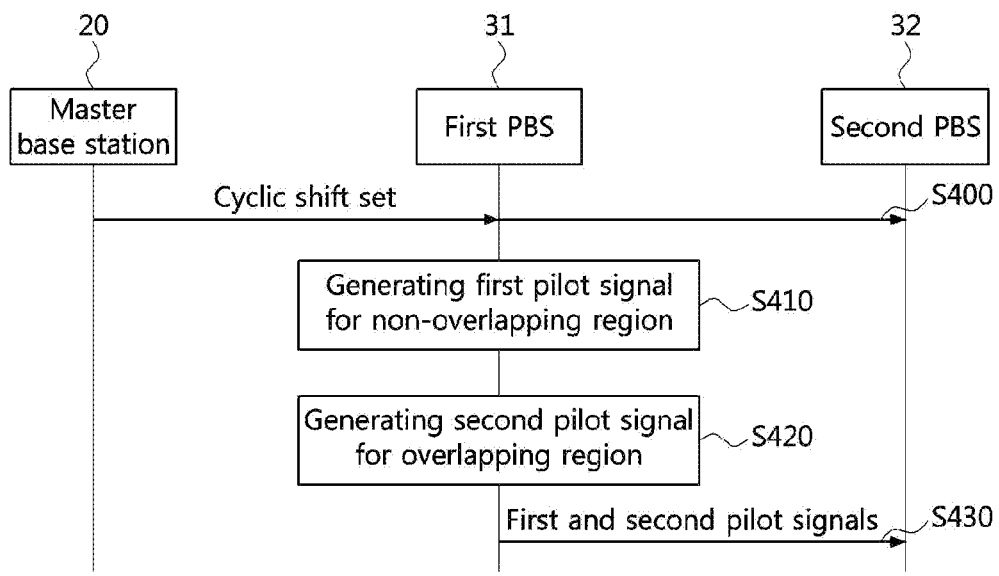
FIG. 8 is a flow chart illustrating a method for transmitting a pilot signal according to an example embodiment of the present invention.

FIG. 8 is a flow chart illustrating a method for transmitting a pilot signal according to an example embodiment of the present invention.

Referring to FIG. 8, the master base station 20 may mean a macro base station managing a macro cell. Also, the first PBS 31 and the second PBS 32 may mean base stations managing personal cells. The first PBS 31 and the second PBS 32 may be located within a cell range of the master base station 20. Here, the first PBS 31 may communicate with the second PBS 32 by using the T-RB illustrated in FIG. 7. Also, the master base station 20 may communicate with the second PBS 32 by using the I-RB illustrated in FIG. 7. In other words, communications between the master base station 20, the first PBS 31, and the second PBS 32 may be performed through a partial co-channel.

Hereinafter, a method for transmitting a pilot signal in the environment in which resources are allocated as shown in FIG. 7 will be explained. The master base station 20 may generate a first cyclic shift value for the first PBS 31 and a second cyclic shift value for the second PBS 32. In this case, the first cyclic shift value may be configured with a value different from the second cyclic shift value. That is, the master base station 20 may assign different cyclic shift values to a plurality of PBSs located within its cell range.

The master base station 20 may generate a cyclic shift set including the first cyclic shift value and the second cyclic shift value. Alternatively, the master base station 20 may generate a cyclic shift set including an index corresponding to the first cyclic shift value and an index corresponding to the second cyclic shift value. Then, the master base station 20 may transmit the cyclic shift set (S400). Here, the master base station 20 may transmit the cyclic shift set in broadcast manner.

Then, each of the first PBS 31 and the second PBS 32 may transmit signals including data and a pilot signal generated based on the cyclic shift value assigned to it. For example, when a time-frequency resource used for the first PBS 31 to transmit data to the second PBS 32 and a time-frequency resource used for communications between the second PBS 32 and the main base station overlap with each other, the first PBS 31 wanting to transmit data to the second PBS 32 may generate pilot signals respectively for a region where the two resources overlap (an overlapping region) and a region where two resources do not overlap (a non-overlapping region).

That is, the first personal base station 31 may generate a first pilot signal based on the cyclic shift value assigned to it which will be applied to the region f0~f1 of the T-RB (i.e. the non-overlapping region) (S410). Also, the first PBS 31 may generate a second pilot signal based on the cyclic shift value assigned to it which will be applied to the region f1~f2 of the T-RB (i.e. the overlapping region) (S420). The first PBS 31 may transmit signals including data, the first pilot signal, and the second pilot signal to the second PBS 32 (S430). Since the second PBS 32 knows the cyclic shift value assigned to the first PBS 31, it may perform channel estimation on the regions f0~f1 and f1~f2 of the T-RB based on the assigned cyclic shift value.

Meanwhile, when partially-identical resources are assigned to communication entities in the method described by referring to FIG. 5 and FIG. 6, pilot signals may be generated respectively for a non-overlapping region where resources of them do not overlap and an overlapping region where resources of them overlap.

Meanwhile, in the partial co-channel environment, if cyclic shift values are appropriately assigned to communication entities, difficulties of channel estimation may be resolved. Re-referring to FIG. 7, if the region f1~f2 of the T-RB is the overlapping region, when a pilot signal corresponding to a cyclic shift value ai is used for the region f0~f2 of the T-RB and a pilot signal corresponding to a cyclic shift value aj is used for the region f1~f3 of the I-RB, pilot signals having low correlations may be generated according to relationship between the size of the region f1~f2 and the cyclic shift values (ai and aj).

For example, when the pilot signal according to the present invention is used for an LTE uplink demodulation reference signal (DMRS), pilot signals do not have to be generated separately for overlapping region and non-overlapping region, in other cases except cases of a below table 1 even for the partial co-channel environment. In these cases (other cases except cases of the below table 1), good channel estimation performance may be achieved by using a single pilot signal having a size of 72.

TABLE 1

|  | Size of f0~f2 | Size of f1~f3 | ai | aj | Size of f1~f2 |
|---|---|---|---|---|---|
| Case 1 | 72 | 72 | 0 | 6 | 24 or 60 |
| Case 2 | 72 | 72 | 0 | 3 | 12 or 48 |
| Case 3 | 72 | 72 | 0 | 9 | 24 or 60 |

The example embodiments of the present invention can be implemented in the form of a program command that can be executed through a variety of computer means and recorded in a computer-readable medium. The computer-readable medium may include program commands, data files, data structures, etc. in a single or combined form. The program commands recorded in the computer-readable medium may be program commands to that are specially designed and configured for the example embodiments of the present invention, or program commands that are publicized and available for those of ordinary skill in the art of computer software.

Examples of the computer-readable medium include hardware devices, such as a read-only memory (ROM), a random access memory (RAM), and a flash memory, specially configured to store and execute program commands. Examples of the program commands include advanced language codes that can be executed by a computer using an interpreter, etc., as well as machine language codes, such as those generated by a compiler. The hardware devices may be configured to operate as at least one software module so as to perform operations of the example embodiments of the present invention, and vice versa.

While the example embodiments of the present invention and their advantages have been described in detail, it should be understood that various changes, substitutions and alterations may be made herein without departing from the scope of the invention.

What is claimed is:

1. A method for transmitting and receiving at least one pilot signal, performed in a first personal base station among personal base stations existing within a cell range of a master base station, the method comprising:
   receiving a cyclic shift set from the master base station;
   generating the at least one pilot signal based on a first cyclic shift value assigned to the first personal base station, wherein the first cyclic shift value is included in the cyclic shift set;
   in response to receiving data from a second personal base station among the personal base stations, performing channel estimation based on a second cyclic shift value assigned to the second personal base station, wherein the second cyclic shift value is included in the cyclic shift set; and
   transmitting the at least one generated pilot signal.

2. The method of claim 1, wherein the cyclic shift set includes cyclic shift values assigned to each of personal base stations in addition to the first and second personal base stations that are within the cell range of the master base station.

3. The method of claim 2, wherein the cyclic shift values are configured differently for each of the personal base stations.

4. The method of claim 1, wherein the cyclic shift set is transmitted to the personal base stations in a broadcast manner.

5. A method for transmitting and receiving pilot signal, performed in a representative personal base station included in a first personal base station group among at least one personal base station group each of which comprises a plurality of personal base stations existing within a cell range of a master base station, the method comprising:
   receiving a first cyclic shift set for the first personal base station group from the master base station;
   assigning cyclic shift values included in the first cyclic shift set to the plurality of personal base stations included in the first personal base station group;
   generating a pilot signal based on a cyclic shift value assigned to the representative personal base station among the first cyclic shift set; and
   transmitting the generated pilot signal,
   wherein when data is received from a first personal base station belonging to the first personal base station group, performing channel estimation for receiving the data based on a cyclic shift value which is included in the first cyclic shift set and assigned to the first personal base station.

6. The method of claim 5, wherein the first cyclic shift set is configured differently from a cyclic shift set for another personal base station group.

7. The method of claim 5, wherein the cyclic shift values are configured differently for each of the plurality of personal base stations included in the first personal base station group.

8. The method of claim 5, wherein the first cyclic shift set is transmitted to the first personal base station group in group-cast manner.

9. The method of claim 5, further comprising:
when data is received from a personal base station belonging to a second personal base station group which is different from the first personal base station group, performing channel estimation for receiving the data in blind searching manner.

10. The method of claim 5, further comprising:
transmitting information on the cyclic shift values assigned to the plurality of personal base stations of the first personal base station group to the master base station.

11. The method of claim 5, further comprising:
receiving, from the master base station, information on at least one cyclic shift value assigned to at least one personal base station of at least one personal base station group located within the cell range of the master base station; and
when data is received from a personal base station belonging to a second personal base station group which is different from the first personal base station group and located within the cell range of the master base station, performing channel estimation based on a cyclic shift value assigned to the personal base station belonging to the second personal base station group.

12. A method for transmitting pilot signal, performing in a first personal base station among a plurality of personal base stations existing within a cell range of a master base station, the method comprising:
receiving a cyclic shift set from the master base station;
when a portion of a first time-frequency resource used by the first personal base station is identical to a second time-frequency resource used by a second personal base station among the plurality of personal base stations, generating a first pilot signal by applying a first cyclic shift value of the first personal base station which is included the cyclic shift set to a region of the first time-frequency resource which overlaps with the second time-frequency resource, and generating a second pilot signal by applying the first cyclic shift value to a region of the first time-frequency resource which does not overlap with the second time-frequency resource; and
transmitting the first pilot signal and the second pilot signal.

13. The method of claim 12, wherein the cyclic shift set includes cyclic shift values assigned to the plurality of personal base stations.

14. The method of claim 13, wherein each of the cyclic shift values is configured differently for each of the plurality of personal base stations.

15. The method of claim 12, wherein the first cyclic shift set is transmitted to the plurality of personal base stations in broadcast manner.

* * * * *